United States Patent
Gray et al.

(10) Patent No.: US 7,820,009 B2
(45) Date of Patent: Oct. 26, 2010

(54) CELLULOSE COMPOSITES COMPRISING HYDROPHOBIC PARTICLES AND THEIR USE IN PAPER PRODUCTS

(75) Inventors: Derek Gray, Montréal (CA); Tiffany Abitbol, Montréal (CA)

(73) Assignee: The Royal Institution for the Advancement of Learning/McGill University, Montreal (CA)

( * ) Notice: Subject to any disclaimer, the term of this patent is extended or adjusted under 35 U.S.C. 154(b) by 874 days.

(21) Appl. No.: 11/703,195

(22) Filed: Feb. 7, 2007

(65) Prior Publication Data

US 2008/0041542 A1  Feb. 21, 2008

Related U.S. Application Data

(60) Provisional application No. 60/822,761, filed on Aug. 18, 2006.

(51) Int. Cl.
  *D21H 17/00* (2006.01)
  *D21H 21/30* (2006.01)
(52) U.S. Cl. ................. 162/140; 162/162; 162/177; 283/72; 428/199
(58) Field of Classification Search ........... 162/140, 162/141, 146, 149, 157.7, 162, 177, 158; 283/72, 74, 82–93, 95–96; 8/116.1, 121; 428/195.1, 199, 916
  See application file for complete search history.

(56) References Cited

U.S. PATENT DOCUMENTS

| | | | | | |
|---|---|---|---|---|---|
| 2,999,788 | A | * | 9/1961 | Morgan | 162/146 |
| 3,676,182 | A | * | 7/1972 | Smith | 427/316 |
| 5,434,878 | A | * | 7/1995 | Lawandy | 372/43.01 |
| 6,007,738 | A | * | 12/1999 | Shimamoto et al. | 252/299.01 |
| 6,552,290 | B1 | * | 4/2003 | Lawandy | 209/576 |
| 6,832,783 | B2 | * | 12/2004 | Lawandy | 283/85 |
| 7,279,073 | B2 | * | 10/2007 | Bowman et al. | 162/261 |
| 7,345,474 | B2 | * | 3/2008 | Engdahl et al. | 324/233 |
| 2004/0217298 | A1 | * | 11/2004 | Bawendi et al. | 250/458.1 |
| 2005/0252981 | A1 | * | 11/2005 | Engdahl et al. | 235/493 |
| 2008/0041542 | A1 | * | 2/2008 | Gray et al. | 162/102 |
| 2009/0014999 | A1 | * | 1/2009 | Patel et al. | 283/72 |
| 2009/0121473 | A1 | * | 5/2009 | Camus et al. | 283/85 |
| 2009/0186205 | A1 | * | 7/2009 | Doublet et al. | 428/215 |

OTHER PUBLICATIONS

Beecroft, L. L.; Ober, C. K., Nanocomposite Materials for Optical Applications. Chemistry of Materials 1997, 9, (6), 1302-1317.
Yuan, Y.; Fendler, J. H.; Cabasso, I., Photoelectron transfer mediated by size-quantized cadmium sulfide particles in polymer-blend membranes. Chemistry of Materials 1992, 4.
Braun, J. L.; Kadla, J. F., Diffusion and Saponification Inside Porous Cellulose Triacetate Fibers. Biomacromolecules 2005, 6, (1), 152-160.
Ritcey, A. M.; Gray, D. G., Cholesteric order in gels and films of regenerated cellulose. Biopolymers 1988, 27, (9), 1363-74.
Ilharco, L. M.; Brito de Barros, R., Aggregation of Pseudoisocyanine Iodide in Cellulose Acetate Films: Structural Characterization by FTIR. Langmuir 2000, 16, (24), 9331-9337.
Kemp, W., Organic Spectroscopy. Third ed.; Macmillian: London, 1975; p. 58.
Ruan, D.; Huang, Q.; Zhang, L., Structure and properties of CdS/regenerated cellulose nanocomposites.
Buchholz, V.; Adler, P.; Baecker, M.; Hoelle, W.; Simon, A.; Wegner, G., Regeneration and Hydroxyl Accessibility of Cellulose in Ultrathin Films. Langmuir 1997, 13, (12), 3206.
Istone, W. K., X-ray photoelectron spectroscopy (XPS) [for studying paper surface chemistry]. Surface Analysis of Paper 1995, 235-268.
Edgar, C. D.; Gray, D. G., Smooth model cellulose I surfaces from nanocrystal suspensions. Cellulose (Dordrecht, Netherlands) 2003, 10, (4), 299-306.
Li, K.; Reeve, D. W., Determination of surface lignin of wood pulp fibres by x-ray photoelectron spectroscopy. Cellulose Chemistry and Technology 2004, 38, (3-4), 197-210.
Johansson, L.-S.; Campbell, J. M.; Koljonen, K.; Stenius, P., Evaluation of surface lignin on cellulose fibers with XPS. Applied Surface Science 1999, 144-145, 92-95.

\* cited by examiner

*Primary Examiner*—José A Fortuna
(74) *Attorney, Agent, or Firm*—Ogilvy Renault LLP

(57) ABSTRACT

Polymer composite films were prepared by solvent casting suspensions of quantum dots (QDs) in cellulose triacetate (CTA) solution. The films were robust and possessed the optical properties characteristic of QDs. Transmission electron microscopy (TEM) images of the films revealed that the QDs were well dispersed within the CTA film matrix. The selective alkaline hydrolysis of QD/CTA films in 0.1N NaOH over 24 hours resulted in the surface conversion of CTA to regenerated cellulose. Optical properties of the films were probed both before and after the hydrolysis reaction using fluorescence spectroscopy, and were found generally unaltered. The cellulose surfaces of the alkaline treated films allow for facile incorporation of the films into paper sheets.

13 Claims, 6 Drawing Sheets

CELLULOSE COMPOSITES COMPRISING HYDROPHOBIC PARTICLES AND THEIR USE IN PAPER PRODUCTS

CLAIM FOR PRIORITY

This non-provisional application claims the benefit of the filing date of U.S. Provisional Patent Application Ser. No. 60/822,761, filed on Aug. 18, 2006.

FIELD OF THE INVENTION

This invention relates a novel cellulose composite, and their manufacture, suitable for use as security devices or tagging, labeling, or tracking devices in paper products.

BACKGROUND OF THE INVENTION

A wide variety of security devices, for example optical tags, are used in packaging and currency applications to establish authenticity. Many of the devices are incompatible with the hot aqueous environment encountered in the manufacture of paper or paperboard. A number of attempts have been made to make tags hydrophilic in order to incorporate them into paper. The present invention takes an entirely different approach by instead supporting a taggant in a heterogenous support and incorporating the composite of the taggant and the support into the paper making process.

SUMMARY OF THE INVENTION

The method of the invention allows the incorporation of a hydrophobic active species, such as hydrophobic particles, into a material form that is hydrophilic, stable and compatible with the wet-laid processes used in paper and board manufacture.

It is an object of this invention to provide a method of incorporating a security identifier, either covert and thereby not visible to the naked eye, or overt. For example, the invention relates to optical taggants such as quantum dots being incorporated into a cellulosic film and thereby indirectly incorporated into paper or packaging material, via the cellulosic film during the manufacturing process. Importantly, the taggants are stable in the composite film and stable in the paper product. It is a further object of the invention to provide a security or traceable or tagged paper or paperboard.

Correspondingly, an aspect the invention relates to a method of incorporating fluorescent particles into a paper product comprising a) Combining a polyacylcellulose solution in organic solvent and a taggant solution, dispersion or suspension in organic solvent to form a mixture; b) Casting a film from said mixture; c) Deacylating at least a portion of the surface of said film by base hydrolysis to form a partially deacylated film comprising fluorescent particles; and d) Combining the partially deacylated film, or fragments thereof, with pulp fibres.

Alternatively defined, a central aspect of the invention relates to a method of preparing a paper product comprising a) Combining i) a polyacylcellulose solution of polyacylcellulose in organic solvent with ii) a taggant solution, dispersion or suspension, comprising an organic solvent so as to form a mixture; b) Casting a film from said mixture; c) Deacylating at least a portion of the surface of said film by hydrolysis using NaOH or KOH to form a partially deacylated film; and d) Combining the partially deacylated film, or fragments thereof, with fibres, such as pulp fibres.

In accordance with one aspect of the invention, there is provided a security paper or paperboard having incorporated therein a stable taggant supported by a cellulosic substrate.

A paper product prepared by the above described method of the invention is a further aspect of the invention.

It is an object of the invention to provide a paper product comprising i. a taggant; and ii. a cellulosic substrate for said taggant; wherein said taggant supported by said substrate is fluorescent and wherein said cellulosic substrate comprises partially acylated cellulose, regenerated cellulose or mixtures thereof.

It is still a further object of the invention to provide precursors for use in the manufacture of security paper or paperboard. Accordingly, it is a further object of the invention to provide a composite of heterogeneous cellulose and a hydrophobic particle. This composite is suitable for incorporation into a paper-making process.

In accordance with this aspect of the invention, there is provided a composite comprising a taggant supported in a cellulosic film for incorporation in a security paper or paperboard In yet another aspect of the invention, there is provided a method of producing a security paper product or paperboard product comprising incorporating in a papermaking stock a composite of the invention and forming a paper or paperboard from said stock.

An intermediate or precursor product is the film suitable for incorporation into the paper product. This key intermediate is a further aspect of the invention, thereby defining a fluorescent composite film comprising i) a taggant and ii) a cellulosic substrate for said taggant; wherein the cellulosic substrate comprises partially acylated cellulose, regenerated cellulose or mixtures thereof. Accordingly, the invention further relates to a method of preparing said stable intermediate. Consequently, a further aspect of the invention is directed to a method of preparing a stable fluorescent cellulosic film comprising deacylation of an acylcellulose film using a base MOH, wherein M is a monovalent counterion, said acylcellulose film comprising a quantum dot, so as to provide said fluorescent cellulosic film.

DETAILED DESCRIPTION OF THE INVENTION

Figure 1:
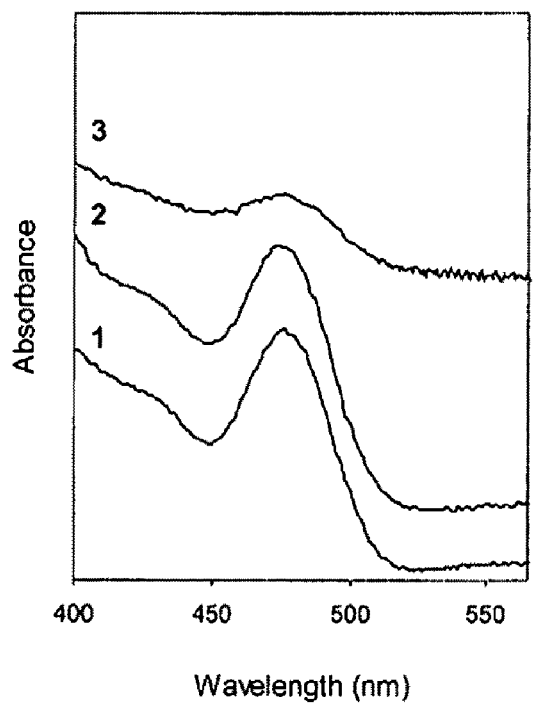
FIG. 1 is a UV-VIS spectra of a 1.9 nm quantum dot in three environments: quantum dots dispersed in toluene; quantum dots dispersed in a 10 g/L CTA solution; and quantum dots embedded in a CTA film.

The term "paper product" is intended to mean paper based any item comprising paper or paperboard, such as for use as currency, for use in passports or other forms of personal or corporate identification, paperboard suitable for use in packaging, labels used for labelling or marking products or prices, admission tickets, cheques, vouchers, or any other cellulose based product which is susceptible to counterfeiting, cellulosic product which needs to be tracked, or cellulosic product which serves for tracking of a valued product.

Hydrophobic particles are particles soluble, partially soluble, or dispersible in an organic solvent, said organic solvent having a polarity index of less than 4.5, typically less than 4. Illustrative examples of organic solvents include xylene, toluene, tetrahydrofuran, diethyl ether, chloroform and benzene. The particles can be defined as being semiconductors, or comprising a metallic element, typically a salt of a metal (sulfides, selenides), and/or detectable by light at various wavelenghths, including IR or UV light or able to fluoresce. The particles can alternatively be a lipophylic dye. The particle is to serve as a taggant. Typically, the hydrophobic particle is a nanoparticle.

The taggant is a hydrophobic particle. It is supported by a heterogenous cellulosic film; the taggant incorporated within the cellulosic film together being referred to as a composite of the invention. The taggant may be, for instance, a lipophylic dye or a quantum dot but may be an optical tag, covert and overt, of any kind. In a preferred embodiment, the taggant is quantum dot and preferably is a number of quantum dots. Quantum dots are well understood by persons in the art, and the teachings relating to quantum dots and similar taggants in US 2004/0217298; U.S. Pat. No. 5,434,878; U.S. Pat. No. 6,552,290; U.S. Pat. No. 6,832,783; and WO 00/17655 are incorporated herein by reference for their technical description of such taggants.

The hydrophobic particles of the invention may be nanoparticles or microparticles or particles of any size. As hydrophobic, they are soluble or dispersable in a solvent having a polarity index from 0 and 3, inclusively. Alternatively defined the particles are soluble or dispersable in a solvent selected from the group consisting of toluene, hexane, heptane, carbon tetrachloride, ether, petroleum ether, tetrahydrofuran and xylene or mixed solvent systems comprising any one of said solvents with acetone, acetonitrile, dichloromethane, chloroform, ethyl acetate, dioxane, or an alcohol.

The term "polyacylcellulose" is intended to mean cellulose that has, on average, 2 or more acyl units per sugar moiety, such as diacylcellulose or triacylcellulose. Functionally, the polyacylcellulose is an acylated cellulose derivative which is soluble in an organic solvent, typically an organic solvent with a polarity index of between 2.5 and 5.5. The organic solvent is preferably selected from the group consisting of acetone, acetonitrile, dichloromethane, chloroform, tetrachloroethane, ethyl acetate, dioxane, hexane, tetrahydrofuran, mixed solvent system of any of said solvents, and mixed solvent systems of any of said solvents with an alcohol, such as ethanol, methanol and isopropanol. The polyacylcellulose of the invention is preferably soluble in a chloroform/methanol mixed solvent system. Furthermore, the acyl of polyacylcellulose is to susceptible to hydrolysis in 0.1N NaOH over 24 hours at room temperature.

Typically, polyacylcellulose is triacylcellulose. The acyl of polyacylcellulose can be functionally described as an acyl which is suitable for the formation of films, conventionally known as film-forming esters of cellulose. Typically, the acyl group of polyacylcellulose is selected from the group consisting of acetyl, mono-, di-, and tri-fluoroacetyl, butyl, and combinations thereof. In a combination of highly suitable embodiments, the polyacylcellulose is triacetylcellulose.

A central aspect of the invention relates to a method of preparing a paper product, comprising a) combining a polyacylcellulose solution and a taggant dispersion or suspension in organic solvent to form a mixture; b) casting a film from said mixture; c) deacylating at least a portion of the surface of said film by hydrolysis using a base other than ammonium hydroxide, such as a monovalent metal hydroxide, such as NaOH or KOH so as to form a partially deacylated film; and d) combining the partially deacylated film, or fragments thereof with pulp fibres.

Part of the invention lies in the selection of compatible solvents for combining the polyacylcellulose and the taggant. The solvents of the polyacylcellulose solution and of the taggant dispersion must be compatible in that they must be substantially miscible.

The solvent for the polyacylcellulose solution is typically an organic solvent so as to provide an organic solution of polyacylcellulose. The solvent for the polyacylcellulose is typically an organic solvent typically has a polarity index of between 2.5 and 5.5. The organic solution may be the polyacylcellulose in a solvent preferably selected from the group consisting of acetone, acetonitrile, dichloromethane, chloroform, tetrachloroethane, ethyl acetate, dioxane, hexane, tetrahydrofuran, mixed solvent system of any of said solvents, and mixed solvent systems of any of said solvents with with an alcohol, such as ethanol, methanol and isopropanol. A preferred embodiment comprises the use of a chloroform/methanol mixed solvent system.

The taggant dispersion is an organic dispersion. The solvent for the organic dispersion of the hydrophobic particle typically has a polarity index between 0 and 3. The organic dispersion comprises a solvent selected from the group consisting of toluene, hexane, heptane, carbon tetrachloride, ether, petroleum ether, tetrahydrofuran and xylene (what other solvents would be suitable), or mixed solvent systems comprising any one of said solvents with acetone, acetonitrile, dichloromethane, chloroform, ethyl acetate, dioxane, or an alcohol.

As stated, the inventors have developed a manner of including the hydrophobic particles into paper. A key step in this aspect for the invention is the judicious selection of solvents and substrates. The inventors have developed a method of preparing a paper product, said method comprising combining a polyacylcellulose organic solution and a hydrophobic particle organic dispersion or suspension wherein polyacylcellulose organic solution comprises, as a solvent, an organic solvent which is miscible with the organic solvent of the hydrophobic particle organic dispersion or suspension.

A film is then cast from said mixture of the hydrophobic particle dispersion and the polyacylcellulose solution. The films typically had thicknesses of about 0.01 to 0.15 mm, more typically of about 0.025 to 0.075 mm, more suitably of about 0.03 to 0.07 mm, such as about 0.03, 0.04, 0.05, 0.06 and 0.07 mm, even more suitably of about 0.04 to about 0.06 mm, such as about 0.05 mm. As will be known to the person skilled in the art, films thicker than 0.15 mm will typically have too low a surface contact relative to their hydrophobicity to be suitable for an aqueous pulping process.

An important aspect of the invention relates to the deacylation process, namely the deacylation of the triacylcellolose of the casted film. Deacylation preferably occurs only at the surface of the film. Deacylation provides a heterogeneous film. Deacylation is preferably at the surface of the film so as to provide regenerated cellulose or partially acylated cellulose at the surface of the film. Deacylation of at least a portion of at least one surface is preferred. The deacylation can be at only one of the surfaces or on both surfaces of the film. At a depth of up to 2.00 µm into the film surface, the alkaline treated films are typically composed of regenerated cellulose and no more than 1.5 acyl groups on average per sugar unit. Otherwise stated, when measured at a depth of 0 to 2 µm into the film surface, the deacylated cellulose comprises 0 to 1.5 acyl groups per sugar unit, preferably from 0 to 1 acyl groups per sugar unit, such as 0, 0.25, 0.5, or 1 acyl group, per sugar unit, on average, over the cellulose film.

Deacylation preferably does not occur in the bulk of the film. Preferably the film which has been subject to deacylation is a heterogenous film wherein the surfaces are fully or partially deacylated and the core is fully acylated or partially deacylated. In the method, the deacylation provides a heterogeneous film comprising, at the surface, cellulose comprising 0-1.5 acyl groups per sugar unit and, at the bulk, cellulose comprising 1.5-3 acyl groups per sugar unit. Typically, the deacylation provides a heterogeneous film comprising, at the surface, cellulose comprising 0-1 acyl groups per sugar unit and, at the bulk, cellulose comprising 2-3 acyl groups per sugar unit.

The deacylation comprises the use of 0.05 N to 0.5 N NaOH or KOH. These alkaline solutions have been selected as they provide a two-fold advantage over, for instance, $NH_4OH$. As discussed infra, $NH_4OH$ failed on two levels. Firstly, under the conditions discussed infra, deacylation did not occur. Secondly, and most notably, it was found that despite the relatively mild hydrolysis conditions, the recovered film no longer fluoresced. The ammonium ion, in a sense, quenched the quantum dots. Surprisingly, neither NaOH nor KOH quench the quantum dot. Moreover, under similar conditions as used for $NH_4OH$, the film was rendered heterogeneous, with surface deacylation and still fluoresced. The use of these bases had two surprising effects: i) they were able to hydrolyze the acyl groups at the surface of the film whilst not deacylating in the bulk of the film thereby providing a heterogeneous film; and ii) the monovalent metal counterions of the base did not quench the quantum dot. The method of the invention involves a deacylation reaction by alkaline hydrolysis using a MOH, wherein M is a monovalent counterion such as Na or K.

The method of the invention provides a heterogeneous film which is hydrophylic on the surface, thereby suitable for mixing with pulp fibres, and hydrophobic at the bulk, thereby allowing incorporation of hydrophobic particles, such as quantum dots. Most notably, by the method of the invention, the taggant remains stable over time. The term "stable" is intended to mean substantially maintaining its fluorescence when stored at room temperature for a period of time of at least 6 months, preferably at least 1 year, even more preferably at least 2 years, such as at least 5 years. The term "substantially maintaining its fluorescence" is intended to mean a reduction in fluorescence activity of less than 50% over the period of time, preferably less than 40%, more preferably less than 30%, such as less than 20%. Otherwise stated, the taggant, when supported in the cellulosic film, or when incorporated in the paper product, preferably maintains at least 50% of its fluorescence activity over the period of time, preferably maintains at least 60% of its fluorescence activity over the period of time, more preferably maintains at least 70% of its fluorescence activity over the period of time, such as at least 80% of its fluorescence activity over the period of time.

The heterogenous film may be stored, packed and distributed to manufacturers of paperbased products for their intended use. The heterogenous film can be incorporated into the pulping process as such but will typically be mechanically ground, comminuted, pulverized, broken-up, cut, or fragmented in any manner into small fragments prior to combining with pulp fibres.

For incorporation into paper, the heterogenous composite film can be up to 5 $mm^2$, typically between 1 $\mu m^2$ and 5 $mm^2$, more typically between 2 $\mu m^2$ and 2 $mm^2$.

Alternatively defined, the preferred embodiment of this aspect of the invention is a taggant supported in a cellulose fibre so as to form a fibrous material. Most preferably, the composite is fibrous cellulose triacetate supporting a quantum dot. The fibre may be subsequently surface deacetylated for incorporation into the paper making process.

Accordingly, a further aspect of the invention relates to a paper product prepared by the method of the invention. The paper product comprises i) a hydrophobic particle, such as a taggant; ii) a heterogeneous cellulosic substrate for hydrophobic particle wherein said hydrophobic particles supported by said substrate is fluorescent and wherein said cellulosic substrate comprises partially acylated cellulose, regenerated cellulose or mixtures thereof.

The cellulosic substrate of the paper product typically further comprises polyacylcellulose. The polyacylcellulose of the paper product is preferably triacetylcellulose and the partially acylated cellulose is preferably partially acetylated cellulose.

A key aspect of the invention relates to the precursor product in the method of preparing a paper product of the invention, namely the composite of heterogeneous cellulose and a hydrophobic particle. This novel composite was not successfully prepared when ammonium hydroxide was used (see Examples). The composite of the invention may be for use in the preparation of a paper product of the invention.

The novel composite of the invention is a heterogeneous cellulose based film wherein the heterogeneous cellulose comprises regenerated cellulose has from 0.25 to 2.25 acyl groups per glucose unit, on average over the length of the film. Typically, at least one surface of the film has less than 1.5 acyl units per sugar unit and the bulk of the cellulose film has more than 1.5 acyl units per sugar unit. Typically, the composite of regenerated cellulose, on average, has from 0.5 to 2 acyl groups per glucose unit. As the person skilled in the art will appreciate, the thickness of the film will influence the average.

The heterogeneous cellulose comprises regenerated cellulose. It is prepared from the hydrolysis of polyacylcellulose with a base MOH, wherein M is a monovalent counterion such as Na or K. Typically the base is selected from the group consisting of NaOH and KOH. Suitably, the acyl group is selected from the group consisting of acetyl and trifluoroacetyl. Triacetyl cellulose (also known as cellulose triacetate or CTA) is highly suitable due to its commercial availability.

The hydrophobic particle may be any taggant, such as a quantum dot or a lipophylic dye.

A further aspect of the invention relates to a fluorescent composite film comprising i) a fluorescent hydrophobic particle; and ii) a cellulosic substrate for said particle; wherein the cellulosic substrate comprises partially acylated cellulose, regenerated cellulose or mixtures thereof. The invention typically relates to a fluorescent composite film comprising i) a fluorescent hydrophobic particle; and ii) a cellulosic substrate for said hydrophobic particle; wherein the cellulosic substrate is a mixture of polyacylcellulose, partially acylated cellulose, regenerated cellulose. The polyacylcellulose is preferably only found at a distance of more than 1.5 μm from at least one surface of the film, such as from 1.75 μm or from 2 μm from one or both surfaces of the film.

The fluorescent composite film suitably has a heterogenous structure and comprises, at least one of its surfaces, a cellulosic substrate selected from the group consisting of partially acylated cellulose, regenerated cellulose, and a mixture thereof. The fluorescent composite film of the invention typically has a heterogeneous structure in that it comprises, at least one of its surfaces, a cellulosic substrate selected from the group consisting of partially acylated cellulose, regenerated cellulose, and a mixture thereof; and further comprises, in its bulk, a cellulosic substrate selected from the group consisting of polyacylcellulose and partially acylated cellulose.

Alternatively defined, the preferred embodiment of this aspect of the invention is a taggant supported in a cellulose fibre so as to form a fibrous material. Most preferably, the composite is fibrous cellulose triacetate supporting a quantum dot. The fibre is subsequently surface deacetylated so as to form a fibrous material of partially regenerated cellulose supporting a number of quantum dots.

A further aspect of the invention relates to a method of preparing a fluorescent cellulosic film comprising a hydrophobic particle as a taggant, said method comprising deacylation of an acylcellulose film. Preferably, said acylcellulose film comprises a quantum dot. Typically, the deacylation comprises using a base selected from the group consisting of NaOH and KOH is at the surface of the acylcellulose film. Obviously; the deacylation step should not quench nor impair the functioning of the taggant.

The resulting film and subsequently paper product sheet exhibits photoactivity, such as exhibiting fluorescence, depending on the nature of the taggant. The fluorescence characteristic of quantum dots embedded within the cellulose is such that emission peak characteristics are determined by the size of the dot. For instance, if 2 different sized dots were used, the fluorescence spectrum of the film or paper product shows emission peaks characteristic of each dot. Accordingly, incorporating varying amounts of different sized dots allows for the tailoring of the final color of the product, which will be visible under ultra-violet excitation. It is much like mixing colors from a color palate. Accordingly, interesting aspects of the invention relate to a taggant solution, dispersion, or suspension comprising taggant of different size, different type, and excitable at different wavelengths. It is also possible to change the observed color in a film containing more than one type of quantum dot by varying the excitation wavelength, since different dots will be excited to differing degrees at a given wavelength. Consequently, the paper may comprise a covert custom colour-coding and colour-tagging of the product, an overt coding system, and combinations thereof.

An interesting embodiment of the invention is directed to a multiplexed cellulose system comprising quantum dots of differing sizes is different film layers. That is to say that quantum dots of a first size range would be at a first depth from the surface of the film and quantum dots of a non-identical second size range would be at a second depth from the surface of the film. Depending on the thickness of the film, third and fourth and fifth layers are anticipated with third and fourth and fifth sizes or repeating layers of the first and or second quantum dot size range.

Alternatively defined, the paper product may comprise i) a film comprising quantum dots of one or more different sizes; ii) a film of multiplexed cellulose system comprising quantum dots of a first size range at a first depth from the surface of the film and quantum dots of a non-identical second size range at a second depth from the surface of the film; iii) two or more films, wherein the first film has first taggant type or quantum dot size range, and the second or further film comprising an alternative taggant type or quantum dot size or taggant concentration.

The amount of taggant required in the film or paper product, or the concentration of taggant required in the solution, dispersion, or suspension prior to mixture with the polyacylcellulose solution, in order for the film or paper product to be photoactive, will depend on the nature of the taggant. In principle, the invention relates to a film or paper product of the invention comprising at least one taggant. In the embodiments wherein the taggant is a quantum dot, the film or paper product comprises at least one active quantum dot. Typically when combining the polyacylcellulose solution with the solution, dispersion, or suspension of quantum dot, the mixture is such that to combine 20-60 g/L of the triacylsolution and about 0.5 mg/L of the taggant in a ratio of 100:1 to 500:1.

In order to fluoresce, a film may comprise active taggants at a concentration of 1 particle per cubic centimeter but may comprise in the order of $10^{25}$ particles, depending on the size and nature of the taggant. In the event the taggant is a quantum dot, the film of the invention typically comprises from $10^2$ quantum dots to $10^{20}$ quantum dots per cubic centimeter.

The weight percent of film in a paper product will vary according to the intended use of the paper product, the nature of the taggant, the nature of the pulp fibers, the presence of other dyes in the paper product, the presence of additives such as glues and polymers found in paperboard and card products. Typically, in the sheet of paper product, the weight percent of film in the sheet is of 0.01 to 70%, such as 0.05 to 50%.

In the paper product, the concentration of film and consequently of the quantum dots will depend upon the intend use and intended effect. In principle, the invention relates to a paper product comprising a heterogeneous cellulose film so as to provide at least one hydrophobic taggant in said paper product.

Certainly, a further aspect of the invention is directed to a method of incorporating fluorescent particles, such as a taggant, into a paper product comprising a) combining a polyacylcellulose solution and a particle dispersion or suspension to form a mixture; b) casting a film from said mixture; c) deacylating at least a portion of the surface of said film by hydrolysis using NaOH or KOH to form a partially deacylated film; and d) combining the partially deacylated film, or fragments thereof with pulp fibres.

Description of Preferred Embodiments

In accordance with a preferred embodiment of the invention, quantum dot/polymer composite films were prepared by solvent casting a suspension of CdSe/ZnS particles in toluene with a cellulose triacetate (CTA) solution in chloroform/methanol. The common solubilities of the organic ligands capping the quantum dots and of the polymer permitted the direct addition of quantum dots into the CTA casting solution, without the occurrence of phase separation.

The films were robust, with typical thicknesses of 0.05 mm, and possessed the optical properties characteristic of the quantum dots.

The selective alkaline hydrolysis of quantum dot/CTA films in 0.1N NaOH over 24 hours resulted in the surface conversion of CTA to regenerated cellulose. X-Ray photoelectron spectroscopy (XPS) and attenuated total reflectance Fourier transform infrared spectroscopy (ATR-FTIR) were employed to study the surface composition of the films and Fourier transform infrared spectroscopy (FTIR) to study the bulk composition. Optical properties of the films were probed both before and after the hydrolysis reaction using UV-VIS and fluorescence spectroscopies, and were found generally unaltered in comparison to the quantum dot solution spectra.

The formation of hydrogen bonds between the cellulose surfaces of the alkaline treated films and cellulose pulp fibers allows for the facile incorporation of the films into paper sheets.

The invention in preferred embodiments employs CdSe/ZnS quantum dots embedded in cellulose triacetate films and in heterogeneous cellulose/cellulose triacetate films, which films are deacetylated and mechanically ground for incorporation in a papermaking stock.

The method allows the incorporation of hydrophobic active species, such as quantum dots, into a material form that is hydrophilic, stable and compatible with the wet-laid processes used in paper and board manufacture. The invention relates to the incorporation of active components into cellulose based materials such as paper and board.

In a specific embodiment, films were cast from solutions of cellulose triacetate, purchased from Sigma-Aldrich. The films were then surface deacetylated in 0.1N NaOH over a time period of 24 hours. The alkaline treatment resulted in a heterogeneous film with a bulk cellulose triacetate composition and a surface cellulose composition.

Core/Shell semiconductor quantum dots dispersed in toluene were purchased from Evident Technologies. A colloidal suspension of quantum dots (one or more types of dots) was added to the stock cellulose triacetate casting solution. Films were cast from the quantum dot and cellulose triacetate mixture and, importantly, the fluorescent properties of the quantum dots were retained in the films. The films were stored at ambient conditions, and the quantum dot emission remained stable over time, indicating that cellulose triacetate is a suitable polymer host for hydrophobic particles. The films were then deacetylated and mechanically ground up, added to a slurry of pulp fibres and made into a paper sheet. The film pieces were strongly bound to the fibres due to the hydrogen bonding between the cellulose surfaces. The resulting paper sheet exhibited the fluorescence characteristic of the quantum dots embedded within the cellulose triacetate film, for instance if 2 different sized dots were used the fluorescence spectrum of the paper sheet showed emission peaks characteristic of each dot.

Incorporating varying amounts of different sized dots is much like mixing colors from a color palate and allows for the tailoring of the final color of the product, which will be visible under ultra-violet excitation. It is also possible to change the observed color in a film containing more than one type of dot by varying the excitation wavelength, since different dots will be excited to differing degrees at a given wavelength.

Other hydrophobic species, including those functioning as taggants, can also be incorporated into paper products in the manner described.

The invention permits to incorporate and protect anti counterfeiting materials in paper and board for currency and packaging applications, as well as for markets, beyond traditional currency and security paper applications. The method allows the incorporation of hydrophobic active species, such as quantum dots, into a material form that is hydrophilic, stable and compatible with the wet-laid processes used in paper and board manufacture. Consequently, the invention relates to the incorporation of active hydrophobic components into paper products such as paper and board. A commercial utility is found in the use of stabile quantum dots incorporated as fluorescent bar codes in order to identify and track an item of interest. Further interesting commercial utilities include the incorporation of the quantum dots in currencies in order to hinder counterfeiters. Moreover, for trademark protection, the quantum dots can be incorporated into cellulose based materials, including labels, in order to deter counterfeiters. The trademark itself may involve the use of the quantum dots and the cellulose based material may also be used and incorporated into clothing or accessories for fashion purposes.

Examples

Materials Cellulose triacetate (43% acetyl content) and Congo red (M.W. 697 g/mol) were purchased from Sigma-Aldrich. Commercial suspensions of CdSe/ZnS QDs in toluene with nominal sizes ranging from 1.9-4.0 nm and nominal concentrations of 0.5-1.18 mg/ml were purchased from Evident Technologies. The QDs were capped with either tri-octyl phosphine oxide (TOPO) or with a proprietary straight 16 carbon chain.

Film preparation A 40 g/L CTA solution was prepared by dissolving CTA in a 9:1 dichloromethane: methanol mixed solvent system. Small volumes (0.1-0.2 ml) of either one or several different sized QDs were added to a 20-25 ml volume of the CTA solution. A homogeneous distribution of QDs in the casting solution was achieved by vigorously stirring the mixture for 1 hour using a vortex mixer. To cast the film, the casting mixture was poured into a glass Petri dish and the solvent was left to evaporate for approximately 24 hours in a dessicator. Transfer to the Petri dish was not quantitative due to the viscous nature of the polymer solution. Finally, the films were carefully peeled off the glass surface. The films were robust, transparent, and had thicknesses on the order of 0.05 mm, depending on the amount of casting solution used and effectively transferred.

Transmission electron microscopy (TEM) TEM images were obtained of QD/CTA films dried onto carbon coated TEM grids using a Philips CM200 TEM, operated at 200 kV, with a point-to-point resolution of 0.24 nm and line resolution of 0.17 nm.

Alkaline hydrolysis To convert the film surfaces to cellulose, the QD/CTA films were submerged in a beaker of either 0.1 N NaOH or 2.4 M $NH_4OH$ over a 24 or 48 hour period with continuous stirring. The films were then removed from the alkaline bath and rinsed thoroughly and repeatedly under a flow of distilled water to remove any excess base. Drying was performed either under ambient conditions or in a 110° C. oven for 1 hour.

Optical characterization UV-VIS spectra were obtained with a Cary 300 BIO UV-Vis spectrometer (Varian) and emission spectra were recorded on a FluoroMax-2 fluorimeter (Jobin Yvon-Spex). All emission curves were obtained at an excitation wavelength of 350 nm and emission and excitation monochromator slit widths of 1 mm and 3 mm, for solutions and films, respectively.

QD content To determine the wt % of QDs in the films, a weighed piece of the QD/CTA film was dissolved in a known volume of a 9:1 dichloromethane: methanol mixture. The mass of QD in the volume of dissolved film was obtained from Beer-Lambert curves of suspensions of QDs in 10 g/L solutions of CTA.

Bulk compositional analysis To study the bulk composition of the films, Fourier transform infrared spectra of both untreated and alkaline treated films were recorded with a Spectrum BX FTIR spectrometer (PerkinElmer). The FTIR spectrum was an average of 8 scans obtained at a resolution of 4 $cm^{-1}$.

Surface compositional analysis Congo red film staining, attenuated total reflectance spectroscopy (ATR-FTIR) and X-ray photoelectron spectroscopy (XPS) were performed to compare the surface composition of untreated and hydrolyzed films. (i) Alkaline treated films were submerged in $4.8 \times 10^{-4}$ M solutions of Congo red dissolved in equal parts of water and ethanol. After 15 minutes, the films were removed from the dye solution and rinsed with copious amounts of distilled water to wash away surplus stain. (ii) ATR-FTIR spectra were obtained using the MIRacler™ ATR accessory (Pike technologies) in conjunction with a Spectrum BX FTIR spectrometer (PerkinElmer). All ATR-FTIR spectra were recorded using a ZnSe crystal plate with a 2.00 μm depth of penetration at 45°. The ATR-FTIR spectrum was an average of 8 scans with 4 $cm^{-1}$ resolution. A correction was applied to the spectra for the higher penetration depth of the IR beam which occurs at lower frequencies. (iii) XPS spectra were recorded of the front and back of four film samples using an AXIS Ultra electron spectrometer (Kratos Analytical), under UHV conditions and equipped with an $AlK_\alpha$ source (12.5 kV, 8 mA). Low resolution 0.33 eV or 1 eV step survey scans provided qualitative information regarding the overall elemental composition of the film surfaces. The high resolution 0.1 eV scans were used to resolve the $O_{1s}$ and $C_{1s}$ peaks and to quantify the $C_{1s}$ peak components. Atomic concentration percentages for the oxygen and carbon components were obtained by applying the appropriate sensitivity factors (S=0.278 for $C_{1s}$ and S=0.780 for $O_{1s}$) to the raw peak areas (I) according to the following equation:

$$\text{Atomic Concentration percent}_A = I_A/S_A \times (I_B/S_B + I_A/S_A)^{-1}$$

In addition to the film samples, XPS spectra were obtained for a piece of Whatman no. 541 filter paper which had been extracted in acetone using a Soxhlet apparatus. The filter paper was intended as a pure cellulose reference.

Paper sheet preparation In general, 0.001-0.2 g of film grounds are added to a 0.0015-0.5% of a fiber suspension. The fiber suspension is a pulp of any kind known to the skilled practitioner such as unbleached Kraft pulp and including specialty, non-fluorescent pulps. The combined suspension of fibers and film are stirred for 0.5 to 12 hours in order to promote encounters between film surfaces and fibers. The film/fiber suspension yields sheets, typically 1-10 sheets, such as 1 to 5, such as 2 with a weight percent of film in the sheet of 0.01 to 70%. In the preparation of one embodiment of a paper product of the invention, using a Wiley mill, an alkaline treated film embedded with QDs was ground through either a 20 μm or a 40 μm mesh. Approximately 0.2 g of film grounds were added to a 0.5% by weight suspension of unbleached Kraft pulp fibers in distilled water. The suspension of fibers and film grounds was stirred for 1 hour in order to promote encounters between film surfaces and fibers. The film/fiber suspension yielded a circular sheet with a weight percent of film in the sheet of approximately 45%.

Results and Discussion with Reference to Figures

The UV-VIS spectrum of a CTA film embedded with a 1.9 nm QD is presented in FIG. 1. The spectra of the 1.9 nm QD in toluene and in a 10 g/L solution of CTA are included for comparison. While the characteristic first excitonic peak located at ~474 nm is present in all three curves, the absorbance spectrum of the film is comparatively broadened and structureless and the higher energy optical transition at ~430 nm is not at all apparent. Broadening and red-shifting of the QD absorbance spectrum can be understood in terms of the transition from isolated QDs, with localized electronic states, to the delocalized electron-hole states characteristic of nanocrystal clusters, i.e. of close-packed ensembles of several nanocrystals. The experimental observation of spectral broadening in the film samples imply some degree of aggregation of the QDs embedded within CTA.

Figure 2:
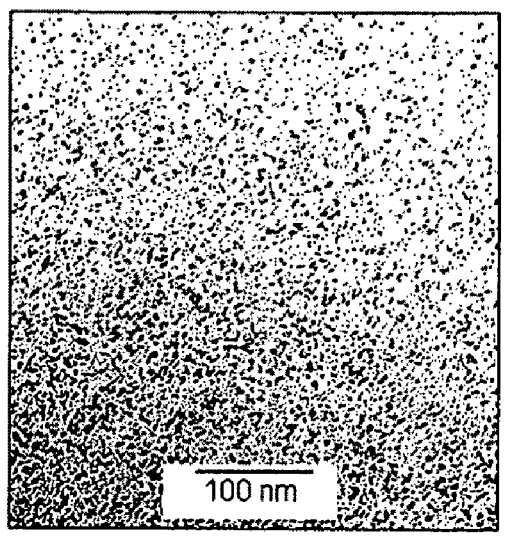
FIG. 2 is a TEM image of CTA film embedded with a 1.9 nm QD.

In general, TEM images showed a relatively homogenous distribution of the QDs/QD clusters within the CTA films. Consistent with the presence of polymer molecules, no evidence of a regular QD packing arrangement or of long range order is observed. A TEM image of a 1.9 nm QD/CTA film is presented in FIG. 2. The film is densely crowded with QDs and there appear to be regions of the film where several QDs are clustered together; however the QDs/QD clusters seem to be well dispersed within the polymer.

Figure 3:
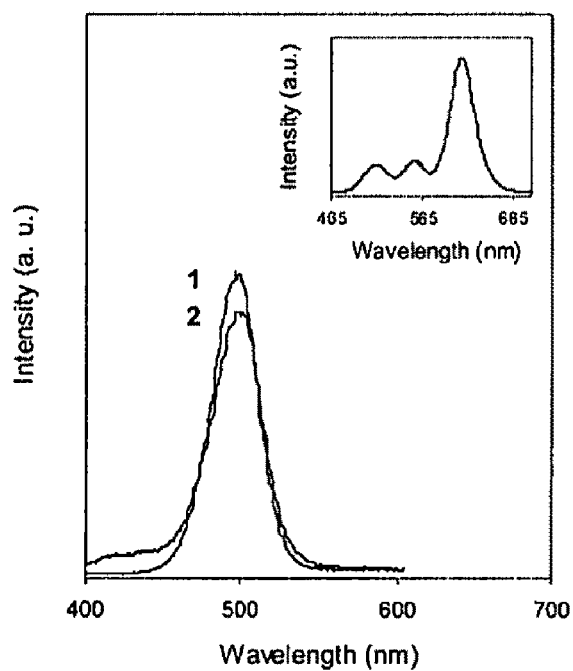
FIG. 3 is an emission spectra of a 1.9 nm quantum dot in 10 g/L CTA solution and CTA film. The inset is an emission spectrum of a CTA film embedded with 3 different sized quantum dots.

The fluorescence spectra of a 1.9 nm QD in a 10 g/L CTA solution and in a CTA film are presented in FIG. 3. The emission spectrum of the QD/CTA film has a broad, high energy tail, centered at ~430 nm, which is attributed to the crystallinity of CTA polymer. In general, the CTA emission is found to be negligible in comparison to the highly luminescent QDs. QD optical transitions are excited at energies greater than or equal to the band gap; it is therefore possible to excite QDs of different sizes at a single wavelength. The inset of FIG. 3 presents the emission of a CTA film embedded with three different sized QDs, and establishes the QD/CTA system as appropriate for multiplexing purposes. Further, in a multiplexed system, changing the excitation wavelength will alter the emission intensities, i.e. at a given excitation wavelength, different sizes and size distributions of the QDs are excited to varying extents. In the present study, different sized QDs were incorporated into a single film without any size segregation. Thus, reabsorption of light emitted from the smaller, higher band-gap QDs by the larger QDs is possible. The reabsorption process will affect the film color which is observed under UV irradiation. In contrast, a more structured film, where the different sized QDs are segregated into separate layers, as anticipated by the present invention, allows greater control of the observed color.

In changing the dispersive medium from toluene to a polymer solution, the viscosity, polarity and hydrogen bonding ability of the QD environment is increased. Solvent properties undoubtedly exert some influence upon the quantum yield but a meaningful correlation between the observed emission and the dispersive environment is non-trivial in the case of quantum dots; solvent-dependant factors involving the surfaces of the QDs likely play a significant role. For instance, the solubility of the surface ligands in a given solvent and the adsorption of solvent molecules or of polymer onto the QD surface will affect the quantum yield.

Figure 4:
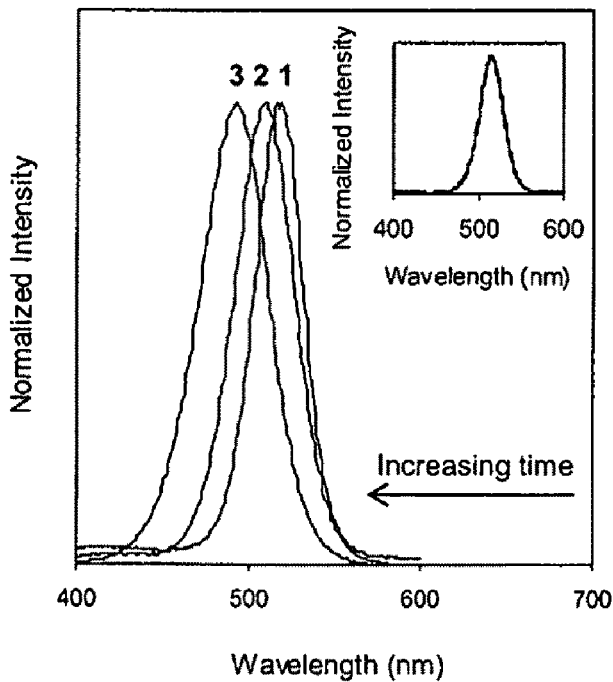
FIG. 4 shows stability over time of the quantum dot/CTA films. The effect of time upon the emission of a 2.1 nm QD/CTA film w. Curve (1) was obtained at time t1, Curve (2) at time t1+60 days and Curve 3 at time t1+187 days.

The stability of the QD/CTA films, stored under ambient conditions in covered plastic Petri dishes, was assessed from fluorescence spectra. In FIG. 4, the emission spectra for a CTA film embedded with a 2.1 nm QD, taken at three different times, is presented. Curve 1 was obtained a short time after the film was cast and curves 2 and 3 were recorded 60 days and 187 days later, respectively. The emission of the 2.1 nm QD in toluene and in a 10 g/L solution of CTA is included for comparison. The characteristic, narrow QD emission peak is retained over time, a good indication that the CTA polymer matrix provides a stable and appropriate environment for the QDs. A relatively large overall blue-shift in the emission wavelength is observed in the films over time and in comparison to the QD emission in solution. Curves 1, 2 and 3 have emission wavelengths of ~518 nm, ~509 nm and ~495 nm, compared to ~515 nm for the QDs in CTA solution and in toluene. As previously discussed, the initial red-shift of ~5 nm may be attributed to aggregation of the semiconductor nanocrystals into clusters; due to the polydispersity of the QD sample, energy transfer from smaller QDs to larger QDs may lead to the observed red-shift23. It is herein proposed that the blue-shift in emission position of the film over time can be attributed to evaporation of residual solvent in the film samples. Trapping the QDs in a non-fluid, rigid media likely inhibits the relaxational processes of the excited state, resulting in emission from a higher energy excited state24. Over time, as the solvent gradually evaporates from within the films, the environment becomes more condensed and the molecules (residual solvent, polymer and ligand) surrounding the QDs are less able to undergo the conformational changes necessary to lower the energy of the excited state. The emission wavelength more or less stabilize once solvent evaporation reaches equilibrium, however, for films stored under ambient conditions, humidity will likely affect the film environment and consequently emission position. In fact, a fluorescence spectrum of this sample obtained at t1+260 days had an emission wavelength of ~513 nm, reflecting further minor fluctuations in the film environment.

Figure 5:
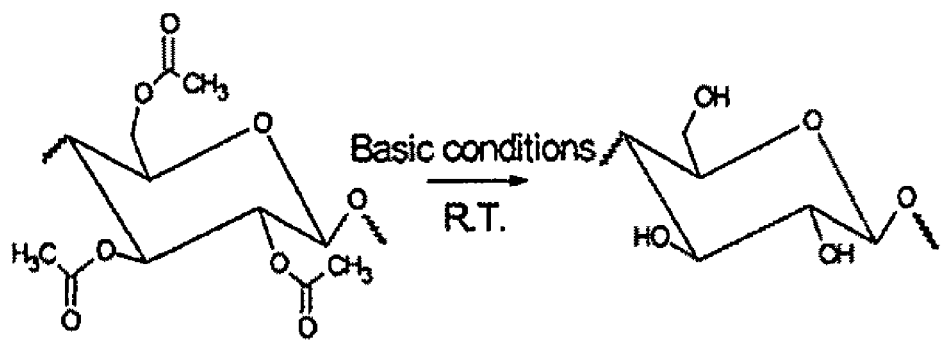
FIG. 5 illustrates alkaline hydrolysis of cellulose triacetate to cellulose. Four conditions were studied: 1) 24 hours in 2.4M $NH_4OH$; (2) 48 hours in 2.4 M $NH_4OH$: (3) 24 hours in 2.4M NaOH; (2) 48 hours in 2.4 M NaOH.

A saponification reaction was utilized to modify the film surfaces; the alkaline hydrolysis of CTA to cellulose is depicted in FIG. 5. Four alkaline hydrolysis conditions were studied; 24 hours in 0.1 M NaOH, 48 hours in 0.1 M NaOH, 24 hours in 2.4 M $NH_4OH$ and 48 hours in 2.4 M $NH_4OH$. Congo Red dye has a high affinity for cellulose, but not for CTA, and can be used as a qualitative measure for the degree of acetyl desubstitution. The azo moieties of Congo red hydrogen bond with the hydroxyl groups of cellulose, staining cellulose film surfaces red; no analogous interaction exists between Congo red and CTA. The Congo red absorbance peak at ~515 nm was used as a marker for the hydrolysis reaction; the more stained a film surface appears, the larger the extent of CTA hydrolysis.

Figure 6:
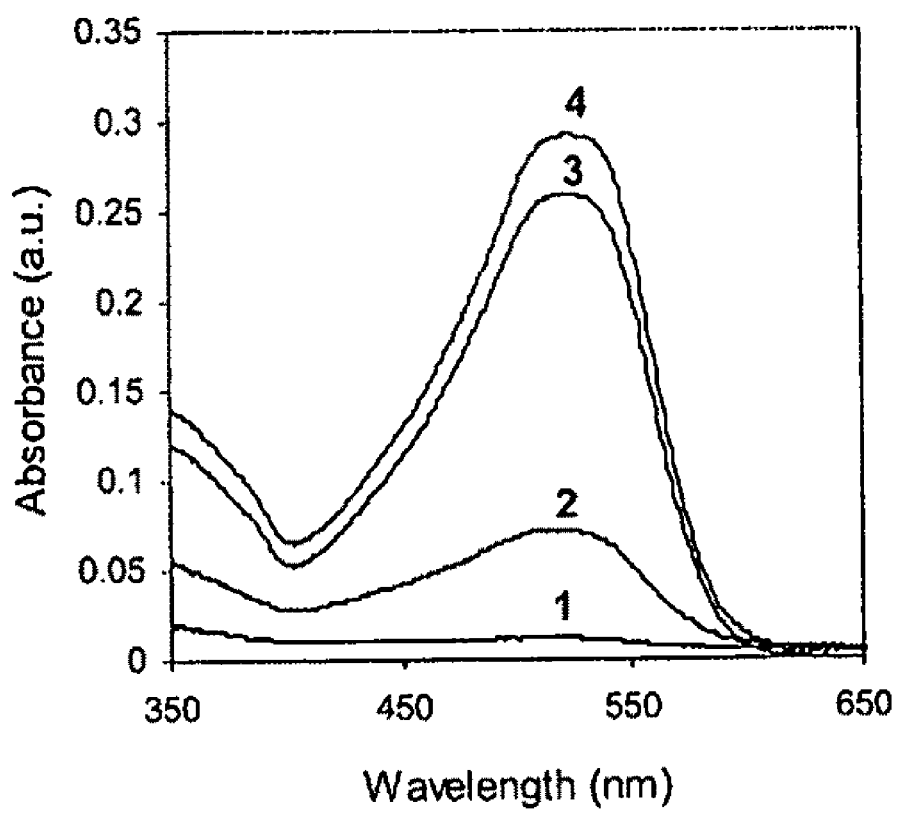
FIG. 6 UV-VIS absorbance spectra of CTA films which have been alkaline treated and stained in Congo red dye. Hydrolysis conditions: 24 hours in 2.4 M $NH_4OH$, 48 hours in 2.4 M $NH_4OH$, 24 hours in 0.1 M NaOH and 48 hours in 0.1 M NaOH.

From the curves presented in FIG. 6, it is apparent that all treatment conditions result in some degree of CTA deacetylation, with the CTA films treated in 0.1 M NaOH experiencing the most significant conversion to cellulose.

Figure 7:
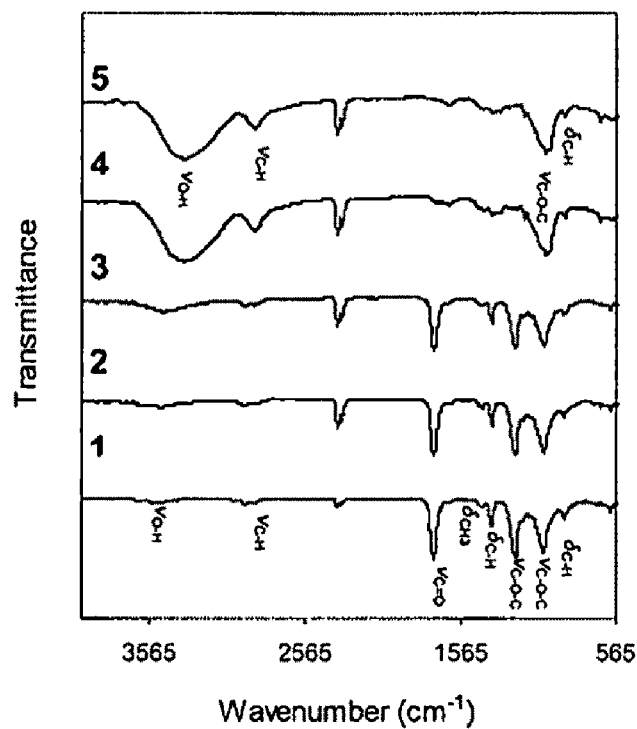
FIG. 7 shows the ATR-FTIR spectra of alkaline treated CTA film embedded with a 1.9 nm quantum dot. Hydrolysis conditions: untreated film, 24 hours in 2.4 M $NH_4OH$, 48 hours in 2.4 M $NH_4OH$, (24 hours in 0.1 M NaOH and (5) 48 hours in 0.1 M NaOH.

However, little information is provided from the Congo red results regarding the depth of hydrolysis. To better assess the depth to which the samples were deacetylated, ATR-FTIR analysis was performed on CTA films incorporating 1.9 nm QDs, which had undergone the previously listed hydrolysis treatments. IR spectra of films embedded with QDs appear identical to spectra of CTA films which do not incorporate the QDs, so infrared absorbance can be used to differentiate between cellulose acetates and regenerated cellulose; most markedly, the carbonyl stretch at ~1730 $cm^{-1}$ is absent in the cellulose spectrum whereas the hydroxyl group absorbance at ~3300 $cm^{-1}$ is increased. A ZnSe crystal plate was used in the ATR-FTIR experiments. For this type of crystal, the infrared beam penetrates 2.00 μm into the sample; the spectrum is therefore representative of the average composition of the sample at a depth of 2.00 μm from the surface. From the spectra presented in FIG. 7, at 2.00 μm into the surface, the 0.1N NaOH treated samples are on average composed of cellulose. The condition of 2.4 M $NH_4OH$ proves insufficient for deacetylation even at the relatively shallow depth of 2.00 μm. Previous reports of attempted deacetylation of CTA films in 2.6 M $NH_4OH$ was on shear-cast CTA films that were much thinner than the solvent cast films of the current study, and these attempts were unsuccessful in providing the desired result. The Congo red and ATR-FTIR results are complimentary; treatment in 0.1N NaOH over 24 hours is sufficient for surface deacetylation and little is gained by an additional 24 hours and, in comparison to the NaOH conditions, reaction in $NH_4OH$ is not extensive. Tables 1 and 2 include a detailed assignment of the infrared absorption peaks for the CTA and regenerated cellulose films.

Figure 8:
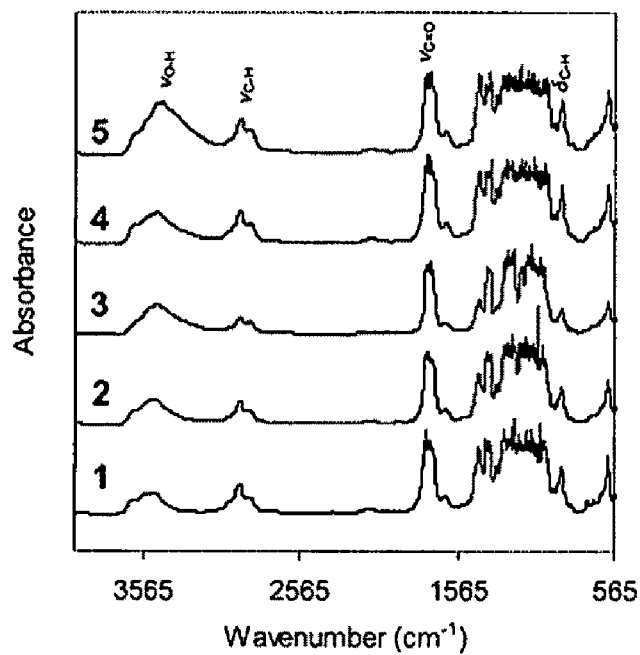
FIG. 8 shows the FTIR spectra of alkaline treated CTA film embedded with a 1.9 nm quantum dot. Hydrolysis conditions: untreated film; 24 hours in 2.4 M $NH_4OH$; 48 hours in 2.4 M $NH_4OH$; 24 hours in 0.1 M NaOH; and 48 hours in 0.1 M NaOH.

The FTIR transmission spectra presented in FIG. 8 show that the bulk of the deacetylated samples remain cellulose triacetate, as indicated by the persistence of the carbonyl absorbance peak at all reaction conditions. Thus, the hydrolysis reaction, inferred from the ATR-FTIR results above, must occur only in the surface region, and does not significantly penetrate into the film. The spectral interpretation presented in Table 1 and 2 still applies, although the peaks located at frequencies lower than 1500 cm-1 are not very well resolved.

Figure 9:
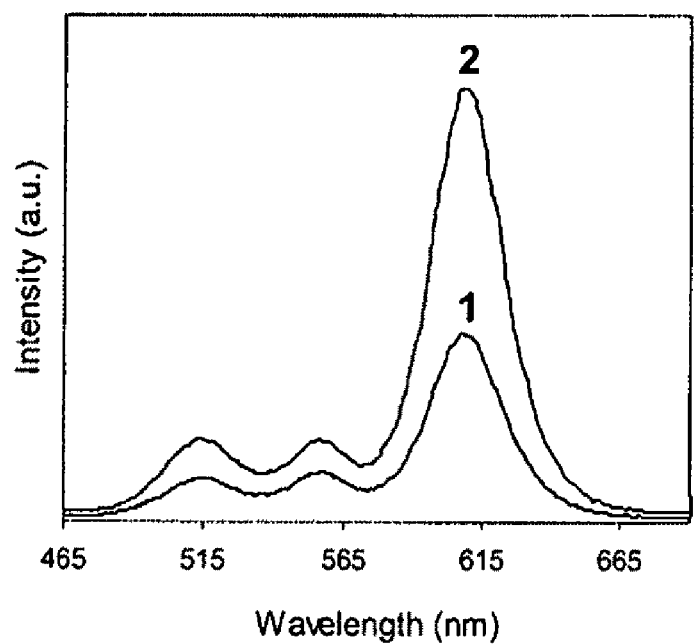
FIG. 9 shows emission spectra of film embedded with QDs before alkaline treatment and post treatment in 0.1 M NaOH.
Figure 10:
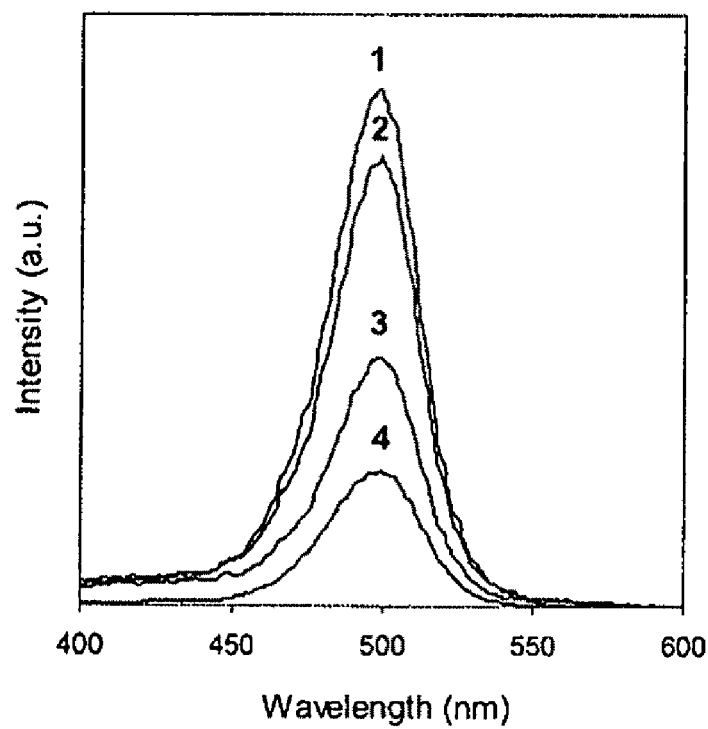
FIG. 10 shows emission spectrum of paper sheet The weight percent of quantum dot in the sheet is approximately 45%.
Figure 11:
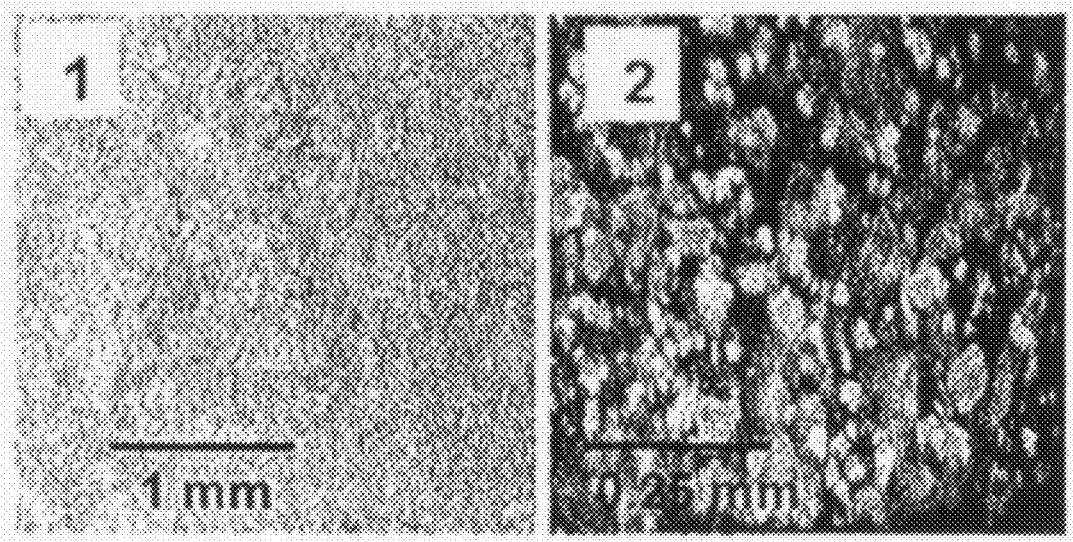
FIG. 11 shows photographs of paper sheets incorporation cellulose/CTA film under (1) ambient and (2) UV-lighting conditions

It was important to determine whether the alkaline treatment of the QD/polymer films resulted in optical degradation of the QDs. In FIG. 9 the emission of a film which has been hydrolyzed in 0.1 M NaOH for 24 hours is compared to the emission of the same film prior to alkaline treatment. The apparent increase in intensity after NaOH treatment is not significant; the variation in the emission curves is attributed to the uneven thicknesses of the solvent cast films; for example, when the thickness of a single film was measured at 12 different film locations, the thickness was found to vary from 0.015±0.003 mm to 0.028±0.007 mm. In general, an increase in the emission intensity with film thickness was observed. The film thickness decreased slightly upon hydrolysis but it was difficult to quantify the change, if any, of the emission intensity upon deacetylation due to the large variation associated with the average emission intensity of a small film area (approximately 1 $cm^2$) of a given average thickness. The previous conclusion regarding the unsuitability of $NH_4OH$ was further reinforced by the quenching of QD emission which was observed in films treated in $NH_4OH$.

XPS was used to estimate the surface conversion of CTA to cellulose. The fronts and backs of six different samples were analyzed; a CTA film, a CTA film embedded with 1.9 nm QDs (QD content estimated at 0.02 weight %) referred to as film C, a deacetylated CTA film, a sheet of Whatman no. 1 filter paper and two deacetylated films embedded with 2.1 nm QDs, designated deacetylated films A and B. Deacetylated films A and B were cast from the same suspension of QDs in polymer and therefore had an identical weight % of QD in CTA, 0.023±0.009%. From the survey scan results of all six samples, the only elements present in significant concentrations were carbon and oxygen. Trace amounts of silicon were detected in most samples, excluding the front surface of the hydrolyzed CTA film, the filter paper and the back surface of the CTA film. Interestingly, XPS did not detect the inorganic elements Cd, Se, Zn, and S which comprise the QDs. The concentration of QDs within the photoelectron escape depth is evidently too low for detection. The survey results may however include a contribution from the hydrocarbon QD ligands to the C(1s) signal.

To attempt a quantitative differentiation of samples, the contributions of the molecular species to the total oxygen O(1s) and carbon C(1s) XPS signals, and to the component C1, C2, C3 and C4 carbons were considered. The labels C1, C2, C3 and C4 refer to a carbon with no oxygen bonds, a carbon with a single oxygen bond, a carbon with two oxygen bonds and a carbon with three oxygen bonds, respectively 35-37. The atom concentrations and binding energies of the C1, C2, C3 and C4 peaks are obtained by resolving the overall carbon 1s peak into its component carbons. In the high resolution scans of the cellulose samples, a small tail (in all cases≦1.95 atomic concentration percent) is observed at a slightly up-field bonding energy from the main C3 peak. The small tail is considered to be part of the C3 peak and not a minor C4 peak 35. Similarly, for the CTA samples, two nearly overlapping peaks are combined to obtain the C1 atomic concentration percentage.

The ratios O/C and C1/(C2+C3+C4) are characteristic of cellulose and CTA. Cellulose has 5 oxygens and 6 carbons per repeat unit (O/C=0.83) and, assuming three acetyl groups per unit, CTA has 9 oxygens and 12 carbons per repeat unit (O/C=0.75). In addition, the C1/(C2+C3+C4) ratio is 0 for cellulose with no C1 carbons, but 0.33 for CTA with a degree of acetyl substitution of 3. In our commercial CTA sample with a percent acetyl content of 43.38%, the actual number of acetyl groups and hydroxyl groups per repeat unit is 2.91 and 0.10, respectively. The corresponding numbers of total carbons, total oxygens and C1 carbons per repeat unit are 11.81, 8.0 and 2.91, respectively, giving a theoretical O/C ratio of 0.68 and a C1/(C2+C3+C4) ratio of 0.326.

Surface contamination by hydrocarbon impurities often causes the measured 0/C values to be lower (and C1 values to be higher) than expected. The XPS results are presented in Table 3. Results for the filter paper and CTA are in reasonable agreement with literature values but deviate from the theoretical values in the manner expected for the presence of carbon-rich material at the surface The XPS evidence for surface carbon-rich contaminants is more marked for the hydrolysed cellulose acetate and particularly for the samples containing quantum dots. The ATR-FTIR evidence discussed above suggests that the surface of the hydrolysed films is essentially pure cellulose, but the observed O/C ratios (0.57-0.65) for the much thinner surface layer sampled by XPS indicates the presence of carbon rich-material. The nature of the material is not known in the case of the hydrolysed cellulose acetate, but we speculate that some of the TOPO or hydrocarbon surfactants used to stabilize the QD suspensions may leach to the cellulose surface.

TABLE 1

Infrared absorption bands for CTA films

| Wavenumber (cm$^{-1}$) | Band assignment |
|---|---|
| 890 | $\delta_{C-H}$ |
| 1024 | $\nu_{C-O-C}$ (pyranose) |
| 1210 | $\nu_{C-O-C}$ (ester) |
| 1365 | $\delta_{C-H}$ |
| 1420 | $\delta_{CH_3}$ ($\alpha$) |
| 1730 | $\nu_{C=O}$ |
| 2872 & 2932 | $\nu_{C-H}$ |
| 3460 | $\nu_{O-H}$ |

TABLE 2

Infrared absorption bands for regenerated cellulose films

| Wavenumber (cm$^{-1}$) | Band assignment |
|---|---|
| 890 | $\delta_{C-H}$ |
| 988 | $\nu_{C-O-C}$ (pyranose) |
| 2850 | $\nu_{C-H}$ |
| 3300 | $\nu_{O-H}$ |

TABLE 3

Atomic concentration percentages obtained from XPS of 5 cellulosic samples. The theoretical values for CTA were calculated for commercial CTA with an acetyl content of 43.38%. Samples A and B are alkaline treated CTA films embedded with a 2.1 nm quantum dot at a weight percent of 0.023 ± 0.009%. The deacylated films were all treated in 0.1 M NaOH over 24 hours. Film C is an untreated CTA film which has a 1.9 nm dot dispersed within at a weight percent of 0.02%.

| Sample | Atomic concentration percents | | | O/C | C1/(C2 + C3 + C4) |
| | C | O | C1 | | |
|---|---|---|---|---|---|
| Filter paper | 57.4 ± 0.4 | 42.6 ± 0.4 | 3.0 ± 0.5 | 0.74 ± 0.01 | 0.0031 ± 0.006 |
| Deacylated CTA | 61 ± 1 | 39 ± 1 | 12 ± 3 | 0.65 ± 0.02 | 0.14 ± 0.04 |
| Deacylated A | 63.4 ± 0.7 | 36.6 ± 0.7 | 31 ± 2 | 0.58 ± 0.01 | 0.45 ± 0.03 |
| Deacylated B | 64 ± 1 | 36 ± 1 | 25 ± 1 | 0.57 ± 0.02 | 0.34 ± 0.02 |
| CTA | 63.8 ± 0.4 | 36.2 ± 0.4 | 26 ± 4 | 0.57 ± 0.01 | 0.35 ± 0.05 |
| Untreated C | 63.7 ± 0.9 | 36.3 ± 0.9 | 28 ± 3 | 0.57 ± 0.02 | 0.39 ± 0.04 |
| Theoretical cellulose | 54.55 | 45.45 | 0 | 0.83 | 0 |
| Theoretical CTA | 58.99 | 41.01 | 20.69 | 0.70 | 0.26 |

The invention claimed is:

1. A method of preparing a paper product comprising
   a) Combining a polyacylcellulose solution in organic solvent with a taggant solution, dispersion or suspension in organic solvent to form a mixture;
   b) Casting a film from said mixture;
   c) Deacylating at least a portion of the surface of said film by hydrolysis using a base MOH, wherein M is a monovalent counterion to form a partially deacylated film;
   d) Optionally, fragmenting said partially deacylated film;
   e) Combining the partially deacylated film, or fragments thereof, with fibres wherein the film or fragments thereof are up to 5 mm$^2$; and
   f) Incorporating the product of step (e) in a papermaking stock and forming the paper product from said stock.

2. The method according to claim 1, wherein the organic solution is selected from the group consisting of acetone, acetonitrile, dichloromethane, chloroform, ethyl acetate, dioxane, hexane, tetrahydrofuran, mixed solvent system of any of said solvents, and mixed solvent systems of any of said solvents with an alcohol, such as ethanol, methanol and isopropanol.

3. The method according to claim 2, wherein the organic solution is a mixed solvent system of chloroform/methanol.

4. The method according to claim 1 wherein the taggant is a number of quantum dots.

5. The method according to claim 1, wherein the organic solution, dispersion, or suspension comprises toluene as a solvent.

6. The method according to claim 1, wherein the polyacylcellulose is cellulose triacetate.

7. The method according to claim 1, wherein the deacylating step is at the surface of the film so as to provide, at the surface of the film, regenerated cellulose or 0-1.5 acyl groups per sugar unit in the cellulose.

8. The method according to claim 1, wherein the deacylation is only at one or both surfaces of the film.

9. The method according to claim 1, wherein the deacylation provides a heterogeneous film comprising, at the surface, cellulose comprising 0-1.5 acyl groups per sugar unit and, at the bulk, cellulose comprising 1.5-3 acyl groups per sugar unit.

10. The method according to claim 1, wherein the deacylation provides a heterogeneous film comprising, at the surface, cellulose comprising 0-1 acyl groups per sugar unit and, at the bulk, cellulose comprising 2-3 acyl groups per sugar unit.

11. The method according to claim 1, wherein the deacylation comprises the use of 0.05 N to 0.5 N NaOH or KOH.

12. A paper product prepared by a method in claim 1.

13. A method of incorporating fluorescent particles into a paper product comprising
   a) Combining a polyacylcellulose solution in organic solvent and a taggant solution, dispersion or suspension in organic solvent to form a mixture, wherein the taggant is fluorescent;
   b) Casting a film from said mixture;
   c) Deacylating at least a portion of the surface of said film by hydrolysis using a base MOH, wherein M is a monovalent counterion to form a partially deacylated film;
   d) Optionally, fragmenting said partially deacylated film;
   e) Combining the partially deacylated film, or fragments thereof, with fibres wherein the film or fragments thereof are up to 5 mm$^2$; and
   f) Incorporating the product of step (e) in a papermaking stock and forming the paper product from said stock.

* * * * *